Aug. 14, 1956  D. D. R. MACKINTOSH  2,758,571
AXIALLY RECIPROCABLE MOTOR
Original Filed Feb. 23, 1949

INVENTOR.
DONALD D.R. MACKINTOSH
BY

United States Patent Office 2,758,571
Patented Aug. 14, 1956

2,758,571

AXIALLY RECIPROCABLE MOTOR

Donald D. R. Mackintosh, Chicago, Ill.

Original application February 23, 1949, Serial No. 77,720, now Patent No. 2,644,964, dated July 14, 1953. Divided and this application July 13, 1953, Serial No. 367,681

4 Claims. (Cl. 121—45)

This application is a division of application Serial No. 77,720, filed February 23, 1949, now Patent No. 2,644,964, granted July 14, 1953.

The invention disclosed in this application relates to improvements in the construction of a novel axially reciprocable motor. More specifically, the motor is designed for use in association with other parts and apparatus making up, for example, a threading machine, although it will become obvious as the description proceeds that the motor has other uses and applications.

It is, therefore, an object of the invention to provide a reciprocable motor embodying novel structural means to afford axial reciprocation of a rotary-driven shaft.

Another object is to provide a motor of the character described, with novel fluid operated means to effect shaft reciprocation while the motor is operating.

Another object is to provide a material working machine with a novel reciprocable motor carrying a tool head.

Another object is to provide a novel reciprocable motor which is positive in operation, inexpensive to manufacture, and very rugged.

With the foregoing and other objects in view which will appear as the description proceeds, the invention consists of certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which when considered in connection with the following description, my invention, its mode of construction, assembly and operation, and many of its advantages, should be readily understood and appreciated.

Referring to the drawings in which the same characters of reference are employed to indicate corresponding or similar parts throughout the several figures of the drawings.

Figure 1:
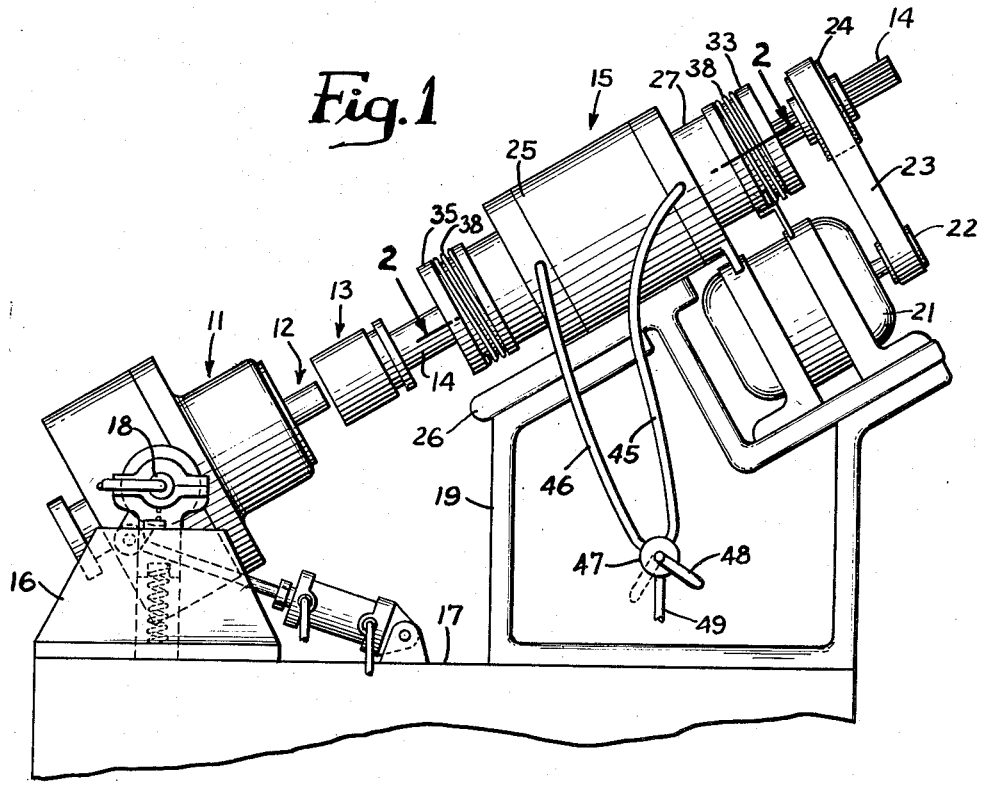
Fig. 1 is a side elevational view of a machine embodying the features of the present invention.

The reciprocable motor of the present invention is shown in the accompanying drawing as being associated with an automatic nipple threading machine. The machine is fully shown, described and claimed in my co-pending application aforesaid, and is here shown only insofar as its structure is necessary to impart utility to the reciprocable motor. The machine illustrated includes a chuck 11 which is adapted to receive and position a work piece 12 so that it may be operated upon by a threading head or other tool 13. The threading head or tool is carried on one end of a longitudinal reciprocable rotatably driven shaft 14 constituting a part of the novel axially reciprocable motor, generally indicated at 15, and to be described in detail hereinafter. The present disclosure shows the motor 15 mounted at an angle to the machine base for purposes of the present illustration, and obviously it may be mounted horizontally or vertically, or at any intermediate angle required of the particular installation.

Referring particularly to Fig. 1, the chuck 11 is supported upon a frame 16 mounted upon a bed 17. It is sufficient to note that the chuck is an automatic work engaging and disengaging chuck and that it is journaled at 18 for rocking movement, from the work position illustrated into a position which will admit removal or insertion of a work piece 12 without interference with the head 13. The axially reciprocable motor 15 is carried firmly on a frame 19, securely mounted on the bed 17. The frame 19 also carries an electric motor 21 connected to a source of electric energy, which has a pulley 22 on its shaft over which is trained a belt 23 connecting said pulley with a pulley 24 splined on the other end of the shaft 14.

The reciprocable shaft 14 is adapted to move towards and away from the work piece 12 during a threading operation. The threading head 13 carried on the end of the shaft, is of the type which automatically releases after the head has moved a predetermined distance down over the work piece so that upon the return movement of the shaft 14, the threading head will slip off the work piece without injuring the threads. This conventional structure is not disclosed or further described herein.

Figure 2:
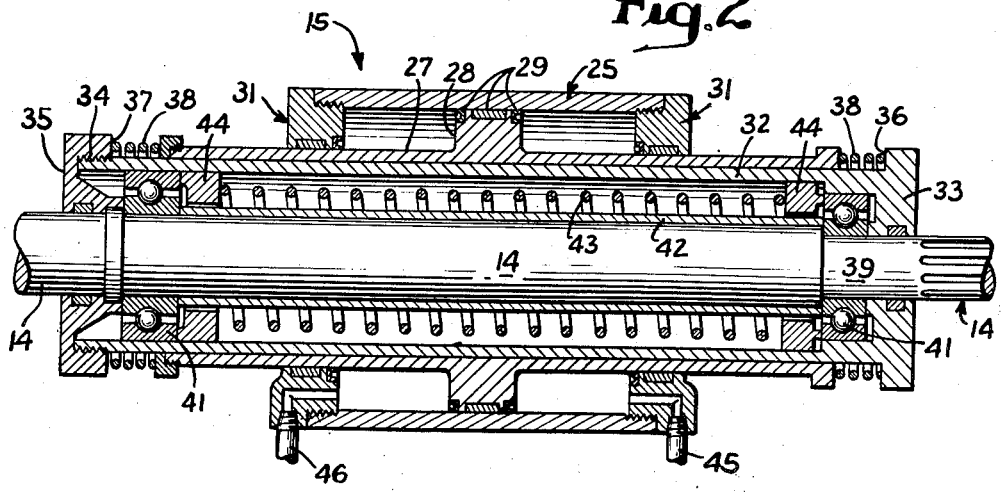
Fig. 2 is a longitudinal central sectional view of the reciprocable motor, taken substantially on line 2—2 of Fig. 1.

The reciprocable motor 15 is carried in a housing 25 formed integral with or otherwise firmly secured to a base plate 26 mounted on the frame 19. Upon referring to Fig. 2, it will be noted that the reciprocable motor includes a cylindrical or tubular piston rod 27, which is mounted for longitudinal reciprocation in the housing 25. The piston rod 27 includes a medial external circumferential enlargement defining a piston 28 which may be provided with piston rings and gaskets, generally indicated at 29, so as to have an air-tight sliding fit within the cylindrical housing 25. Circular end walls 31, screw-threaded into opposite ends of the housing 25, provide a hermetic seal at the housing ends, so as to prevent the escape of fluid delivered, in a manner to be described presently, to the interior of the housing 25 for moving the piston 28 in either direction longitudinally.

A tubular bushing 32 is mounted slidably within the tubular piston rod 27. This bushing is longer than the piston 27 and is closed at one end as by means of an integral end wall 33. It is provided on its other end with external threads 34 to receive and secure a cap-ring 35 thereon. The end wall 33 and the cap-ring 35 are of larger external diameter than the diameter of the tubular bushing 32, so as to afford shoulders 36 and 37 opposite the respective ends of the piston rod 27. Coil springs 38 are interposed between the piston rod ends and said shoulders to afford means whereby the tubular bushing 32 may shift longitudinally relative to the piston 27 when pressure is applied end-wise to the bushing. This structure affords means whereby any excessive thrust on the tubular bushing may be absorbed without shock. Such thrust, in either direction, may occur should the piston advance too rapidly or too slowly for the pitch of the thread. Were it not compensated for by the springs 38, the thread could be knocked out of shape. The bushing end wall 33 and the cap-ring 35 are provided with axial openings through which the shaft 14 extends. The shaft is reduced as one end, as at 39, so as to provide a reduced diameter passing through the end wall 33 and to receive slidably thereon the pulley 24. This arrangement affords means whereby the shaft 14 may rotate during machine operation and during shifting longitudinally of the piston rod 27 relative to the housing 25. Antifriction thrust-bearings 41 are provided at each end of the tubular bushing 32 and are retained in place by a sleeve 42 carried on the shaft 14 and having its ends in tight abutment with the inner races of said bearings. A compression spring 43, surrounding the sleeve 42, bears against collars 44 so as to urge said collars tightly against the outer bearing races. As previously stated, the other end of the shaft 14 which extends through the cap-ring 35, carries the threading head 13.

In operation, the threading head 13 is positioned substantially as shown in Fig. 1. When the chuck 11 is positioned to locate the work piece 12 in axial alignment therewith, fluid, under pressure, and obtained from any suitable source, is admitted into what might be termed the "advancing" end of the housing 25 through a fluid line 45. When this occurs, the piston 28 and shaft 14 are advanced forwardly to carry the threading head downwardly over the work piece. As soon as the predetermined amount of threading of the work piece has been accomplished, automatic means not constituting a part of the present invention may be actuated to stop the flow of fluid through the fluid line 45 and to admit fluid under pressure through a fluid line 46 into the "return" end of the housing. The admittance of fluid into the "return" end of the housing 25 carries the piston 28 in the opposite direction to thereby withdraw the threading head 13 from over the work.

In the present disclosure, no automatic means for effecting operation of the piston 28 is disclosed, but in its stead there is shown, for purposes of illustration, a manually-actuated valve 47, having an operating handle 48 readily movable into any one of its two positions so as to connect either one or the other of the lines 45—46 with a main fluid line 49 connected to a source of fluid pressure. The valve 47 is of a type that will permit venting of whatever line 45 or 46 is not momentarily in service to deliver fluid under pressure into the piston housing 25.

It is believed that my invention, its mode of construction and assembly, and many of its advantages, should be readily understood from the foregoing without further description, and it should also be manifest that while a preferred embodiment of the invention has been shown and described for illustrative purposes, the structural details are, nevertheless, capable of wide variation within the purview of my invention, as defined in the appended claims.

What I claim and desire to secure by Letters Patent of the United States is:

1. A reciprocal motor comprising, in combination, a closed body, a tubular piston rod mounted for axial movement in said body, the ends of said piston rod extending beyond the body, a piston within said body movable with the piston rod, a tubular bushing externally flanged at one end mounted for axial movement in said piston rod, said bushing extending beyond the ends of the piston rod, a rotatable shaft extending through and journaled in said bushing, a cap secured on the other bushing end, and springs surrounding the bushing one between one piston rod end and the external flange and the other between the other piston rod end and said cap, said springs providing compensating means to absorb excessive axial thrust on the shaft.

2. A reciprocal motor of the character recited in claim 1, in which the journal for the rotatable shaft consists of antifriction bearings.

3. A reciprocal motor of the character recited in claim 1, in which the journal for the rotatable shaft consists of antifriction bearings and spring means is provided to retain the outside bearing raceways in place.

4. A reciprocal motor comprising, in combination, a closed body, a tubular piston rod mounted for axial movement in said body, the ends of said piston rod extending beyond the body, a piston within said body movable with said piston rod, a tubular bushing mounted for axial movement in said piston rod, said bushing extending beyond the ends of said piston rod, a shaft journaled in and extending axially through said bushing, said shaft being axially movable with the bushing, an external collar on each end of said bushing, and springs one surrounding each extended end of the bushing, each spring being retained between the related collar and related piston rod end so as to compensate for excessive axial thrust.

References Cited in the file of this patent

UNITED STATES PATENTS

| | | |
|---|---|---|
| 2,356,598 | Lang et al. | Aug. 22, 1944 |
| 2,454,235 | Tomek | Nov. 16, 1948 |
| 2,640,515 | Johnson | June 2, 1953 |
| 2,665,593 | Williams | Jan. 12, 1954 |